US008902712B2

(12) United States Patent
Radtke et al.

(10) Patent No.: US 8,902,712 B2
(45) Date of Patent: Dec. 2, 2014

(54) METHOD FOR ENHANCING LOW FREQUENCY OUTPUT OF IMPULSIVE TYPE SEISMIC ENERGY SOURCES AND ITS APPLICATION TO A SEISMIC ENERGY SOURCE FOR USE WHILE DRILLING

(75) Inventors: Robert P. Radtke, Kingwood, TX (US); Robert H. Stokes, Austin, TX (US); David A. Glowka, Red Rock, TX (US)

(73) Assignee: Technology International, Inc., Kingwood, TX (US)

( * ) Notice: Subject to any disclaimer, the term of this patent is extended or adjusted under 35 U.S.C. 154(b) by 1129 days.

(21) Appl. No.: 12/337,406

(22) Filed: Dec. 17, 2008

(65) Prior Publication Data
US 2009/0154290 A1    Jun. 18, 2009

Related U.S. Application Data

(60) Provisional application No. 61/014,473, filed on Dec. 18, 2007.

(51) Int. Cl.
*G01V 1/157* (2006.01)
*G01V 1/40* (2006.01)

(52) U.S. Cl.
CPC . *G01V 1/40* (2013.01); *G01V 1/157* (2013.01)
USPC .............. 367/147; 367/25; 181/103

(58) Field of Classification Search
CPC ................. G01V 1/40; G01V 1/157
USPC .......... 166/248; 367/25, 31, 32, 55, 103, 147; 181/102–106; 324/351
See application file for complete search history.

(56) References Cited

U.S. PATENT DOCUMENTS

| | | | | |
|---|---|---|---|---|
| 4,345,650 A | * | 8/1982 | Wesley | 166/249 |
| 5,178,120 A | * | 1/1993 | Howson et al. | 123/605 |
| 5,228,011 A | * | 7/1993 | Owen | 367/147 |
| 5,301,169 A | * | 4/1994 | Baria et al. | 367/147 |
| 5,796,677 A | | 8/1998 | Kostek et al. | |
| 5,948,171 A | * | 9/1999 | Grothaus | 134/1 |
| 7,121,342 B2 | | 10/2006 | Vinegar et al. | |

(Continued)

FOREIGN PATENT DOCUMENTS

| | | | | |
|---|---|---|---|---|
| GB | 2377496 A | | 1/2003 | |
| GB | 2404983 A | * | 2/2005 | G01V 1/44 |

OTHER PUBLICATIONS

R. Holzner, et al., "Hydrocarbon Microtremors Interpreted as Oscillations Driven by Oceanic Background Waves," EAGE 68th Conference and Exhibition, Vienna, Austria, Jun. 12-15, 2006.*

(Continued)

*Primary Examiner* — Daniel L Murphy
(74) *Attorney, Agent, or Firm* — Richard A. Fagin

(57) ABSTRACT

A method for operating an impulsive type seismic energy source in a firing sequence having at least two actuations for each seismic impulse to be generated by the source. The actuations have a time delay between them related to a selected energy frequency peak of the source output. One example of the method is used for generating seismic signals in a wellbore and includes discharging electric current through a spark gap disposed in the wellbore in at least one firing sequence. The sequence includes at least two actuations of the spark gap separated by an amount of time selected to cause acoustic energy resulting from the actuations to have peak amplitude at a selected frequency.

13 Claims, 9 Drawing Sheets

(56) References Cited

U.S. PATENT DOCUMENTS

| | | | |
|---|---|---|---|
| 2001/0011590 A1 | 8/2001 | Thomas et al. | |
| 2005/0038362 A1* | 2/2005 | Schultheiss | 601/4 |
| 2006/0044940 A1* | 3/2006 | Hall et al. | 367/82 |
| 2007/0153627 A1 | 7/2007 | Tulett et al. | |

OTHER PUBLICATIONS

International Search Report and Written Opinion, Application No. PCT/US08/87241.

Saenger, A hydrocarbon microtremor survey over a gas field, Spectraseis, Zurich, CH, Internet publication (Oct. 17, 2007).

* cited by examiner

METHOD FOR ENHANCING LOW FREQUENCY OUTPUT OF IMPULSIVE TYPE SEISMIC ENERGY SOURCES AND ITS APPLICATION TO A SEISMIC ENERGY SOURCE FOR USE WHILE DRILLING

CROSS-REFERENCE TO RELATED APPLICATIONS

Priority is claimed from U.S. Provisional Application No. 61/014,473 filed on Dec. 18, 2007.

STATEMENT REGARDING FEDERALLY SPONSORED RESEARCH OR DEVELOPMENT

This invention was made pursuant to contract number DE-FC26-04NT42242 with the United States Department of Energy. The Government retains certain rights in the invention.

BACKGROUND OF THE INVENTION

1. Field of the Invention

The invention relates generally to the field of seismic methods of subsurface geological mapping and correlation. More specifically, the invention relates to seismic energy sources that are used in wellbores drilled through the earth.

2. Background Art

Seismic geological mapping techniques known in the art include seismic surveys made from within wellbores drilled through the earth. Such surveys are known in the art as "vertical seismic profile" surveys ("VSPs"). One objective of obtaining a VSP in a wellbore is to be able to determine the velocity of seismic energy through the various layers of the earth by directly measuring seismic travel time from the earth's surface to a known depth within the wellbore in the earth. Velocity information is important in order to infer depths of subsurface structures mapped from surface-acquired seismic surveys.

One type of VSP technique includes actuating a seismic energy source at the earth's surface and measuring seismic travel time to a seismic receiver disposed in the wellbore at known depths. Typically such receivers are lowered to selected depths in the wellbore at one end of an armored electrical cable ("wireline"). Another VSP method, called "inverse VSP", includes positioning a seismic energy source in a wellbore at selected depths, actuating the source and detecting seismic energy using receivers disposed at the earth's surface. Various types of seismic sources and seismic receivers are known in the art for use in a wellbore.

Although the foregoing VSP techniques are referred to for convenience as "wireline" techniques, the discussion below with respect to the limitations of such techniques is equally applicable to VSP techniques where the source or receiver is conveyed into the wellbore by means of drill pipe, coiled tubing, or the like. Irrespective of the actual conveyance mechanism used, wireline VSP techniques known in the art typically require that the wellbore already be drilled in order to position the source or receiver at any selected depth in the wellbore. In many instances, it is desirable to have an estimate of seismic velocity prior to actually drilling through particular formations, not the least important reason for which is because some formations have fluid pressure in pore spaces therein which exceeds pressures normally encountered at identical depth levels. As is well known in the art, estimates of seismic velocity may be used to make estimates of fluid pore pressure prior to drilling through these formations. Estimates of such pressures may be made, for example, using VSP techniques known in the art by temporarily stopping drilling, and inserting a receiver or source into the wellbore at or near the bottom of the wellbore and taking a so-called "checkshot" survey. In a checkshot survey, a seismic travel time from the known depth in the wellbore to the earth's surface is used to "calibrate" seismic surveys made entirely at the earth's surface in order to better estimate formation fluid pressure in as-yet-undrilled formations. However, stopping drilling to make checkshot surveys using techniques known in the art is time consuming, and thus expensive.

It is known in the art to include a seismic receiver in the drill string (drilling tool assembly) during drilling operations in order to reduce the time used to obtain VSP data while a wellbore is being drilled. In this technique, a seismic source is actuated at the earth's surface, as in other types of VSP surveys, and signals are recorded in appropriate circuits coupled to the receiver in the wellbore. Several types of wellbore seismic receivers for use during drilling are known in the art. See for example, U.S. Pat. No. 5,555,220 issued to Minto. A limitation to the technique of obtaining a VSP survey while drilling using a receiver in the drill string is that the broad range of signals detected by the receiver typically cannot be completely interpreted with available downhole processing means until the drill string (having the receiver therein) is removed from the wellbore. It is necessary to remove the receiver from the wellbore and interrogate the contents of the recording device because while-drilling measurement systems known in the art are typically limited to relatively slow forms of signal telemetry, such as mud pressure modulation or low-frequency electromagnetic telemetry. While-drilling telemetry systems known in the art are generally limited to a data rate of about 5 to 10 bits per second. As a result, even with data compression techniques known in the art, interrogating a wellbore seismic receiver substantially in real time is impracticable. Another operating consideration when using drill string mounted seismic receivers is the need to substantially stop drilling operations during the times at which seismic signals are to be detected. In many cases, the amount of acoustic noise caused by movement of the drill string within the wellbore is such that detecting seismic signals is difficult while drilling operations are in progress.

Another while-drilling VSP survey technique known in the art uses the drill bit as a seismic energy source. In this technique, a pilot sensor is mounted at the top of the drill string, and seismic sensors are deployed at the earth's surface. Signals detected by the seismic sensors are cross-correlated to the signals detected by the pilot sensor to determine the impulse response of the earth. Drill bit VSP techniques known in the art include methods for determining a closer representation of the drill bit seismic signature, and time correcting the pilot signal for seismic travel time through the drill string. Limitations of drill bit-source VSP techniques known in the art include, foremost, that roller cone drill bits must be used. In many drilling situations, it is preferable to use fixed cutter bits, such as polycrystalline diamond compact ("PDC") bits. In such cases, it has proven substantially impossible to obtain a usable seismic signal from the bit. It is also known in the art that the seismic energy radiation pattern of roller cone bits is such that when the wellbore inclination from vertical exceeds about 30 to 40 degrees, the amount of seismic energy reaching the earth's surface proximate the equivalent surface location of the wellbore is very small. As a result of the limitations of bit-source VSP methods known in the art, the practical applications of bit-source VSPs have been limited.

Alternatively, a seismic energy source can be positioned in the wellbore and actuated at selected times during drilling. Seismic sources known in the art for use while drilling have generally not performed sufficiently well to be commercially useful. As a result, there is a need for an improved seismic energy source for use while drilling operations are in progress.

Another seismic energy source for use while drilling a wellbore is disclosed in U.S. Patent Application Publication No. 2004/0240320 filed by McDonald et al. The source according to this aspect of the invention includes a drive shaft adapted to be coupled in a drill string, and a housing rotatably supported outside the drive shaft. At least one contact member is disposed on an exterior of the housing and is selectively urged into contact with a wall of a wellbore surrounding the housing. The source includes means for selectively controlling a force applied to the at least one contact member.

There continues to be a need for seismic energy sources that can be used while drilling is in progress.

SUMMARY OF THE INVENTION

A method according to one aspect of the invention includes operating an impulsive type seismic energy source in a firing sequence having at least two actuations for each seismic impulse to be generated by the source. The actuations have a time delay between them related to a selected energy frequency peak of the source output.

A method according to another aspect of the invention is for generating seismic signals in a wellbore. A method according to this aspect of the invention includes discharging electric current through a spark gap disposed in the wellbore in at least one firing sequence. The sequence includes at least two actuations of the spark gap separated by an amount of time selected to cause acoustic energy resulting from the actuations to have peak amplitude at a selected frequency.

Other aspects and advantages of the invention will be apparent from the following description and the appended claims.

DETAILED DESCRIPTION

The invention is described by way of an example of a sparker type seismic energy source deployed in a wellbore. The principle of operation of a sparker type seismic energy source according to the invention is believed to be applicable to all "impulsive" type seismic energy sources. As used herein, the term "impulsive" is intended to mean that substantially all the energy produced by the source is created in a single act of operation of the source. Examples of impulsive type sources include, without limitation, air guns, water guns, "thumpers" and dynamite. By operating an impulsive type seismic energy source as will be explained below with reference to the sparker example, it has been determined that the energy output of the source can be materially enhanced at lower frequencies. In particular applications, such as seismic while drilling, enhancing the low frequency output may make possible seismic imaging using types of seismic sources that operated otherwise would not provide useful signals for seismic imaging.

Figure 1:
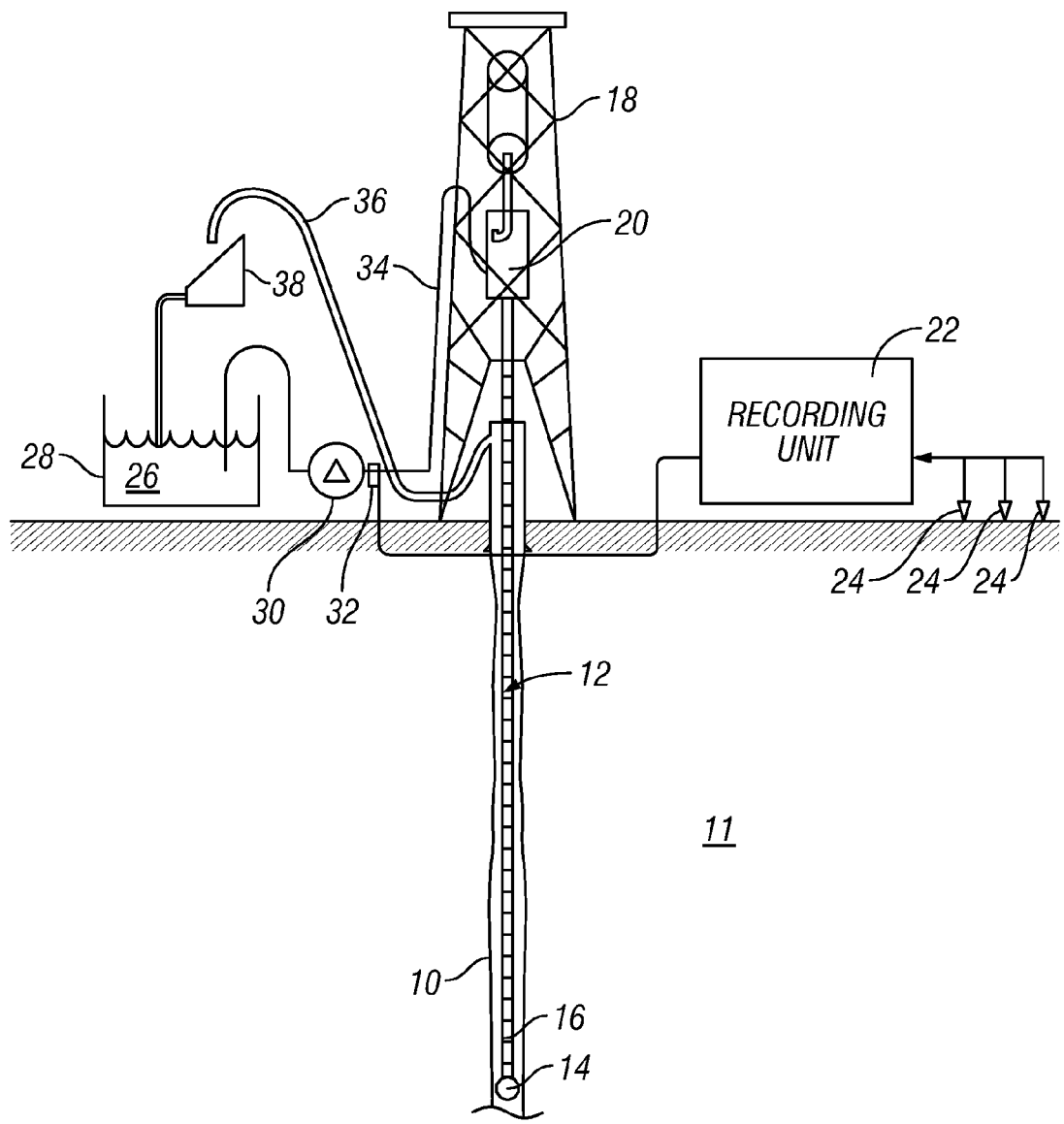
FIG. 1 shows an example of a seismic energy source being used during a drilling operation.
Figure 1A:
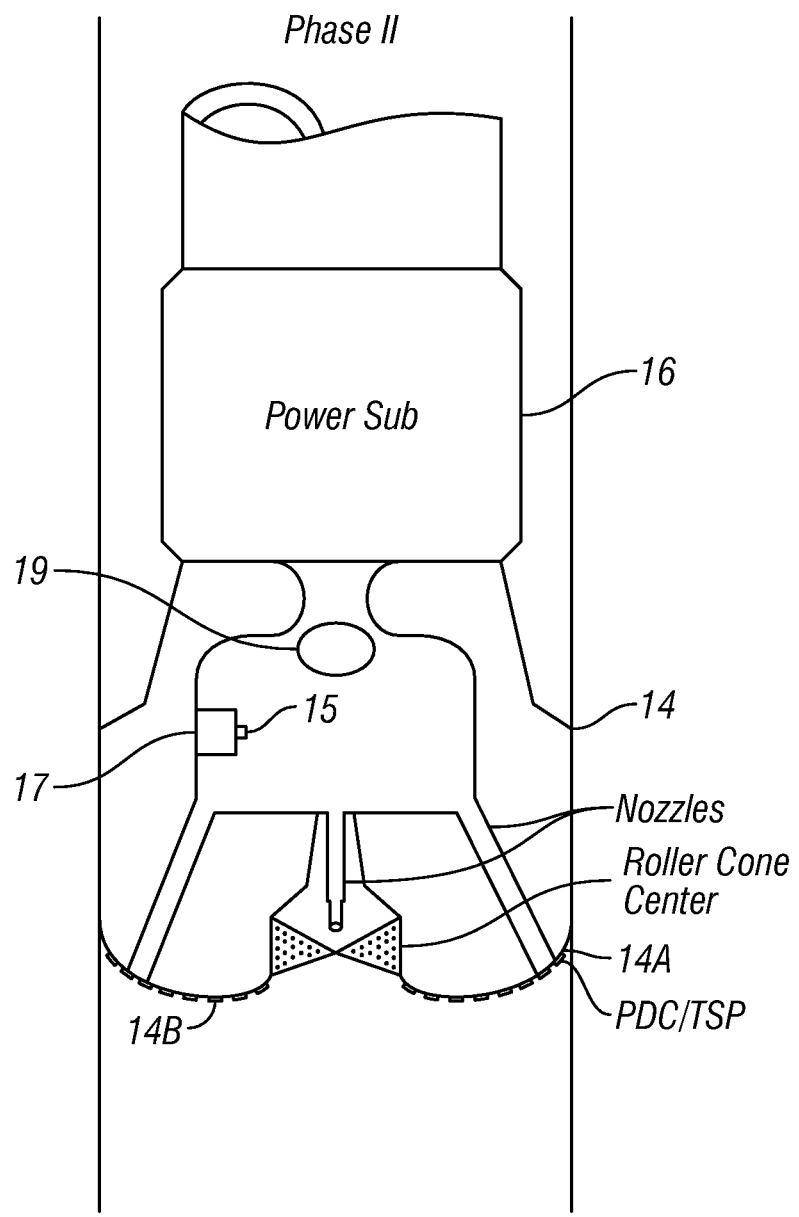
FIG. 1A shows an example drill bit conveyed sparker seismic energy source.

FIG. 1 shows an example of a seismic energy source that can be used while drilling a wellbore through subsurface rock formations. A drilling rig 18 or similar hoisting device supports a drill string 12. The drill string 12 may be a length of conduit or pipe assembled from threadedly coupled segments or "joints" coupled end to end. The lower end of the drill string 12 has a drill bit 14 including a seismic while drilling source (FIG. 1A) coupled thereto. The bit 14 includes cutting elements (FIG. 1A) configured to gouge and/or crush rock formations 11 by action of rotation of the bit 14 and axial force caused by application of some of the weight of the drill string 12 to the bit 14. A signal acquisition and processing sub 16 ("sub") may include an electric power source such as a turbine operated generator (not shown separately) and circuitry to control operation of the seismic while drilling source (FIG. 1A). The sub 16 may also include other sensing devices (none shown separately), for example, gamma ray sensors, resistivity sensors, density sensors and neutron porosity sensors for use while drilling. The sub 16 may also include a device (not shown separately) to modulate flow of a drilling fluid through the drill string 12 so as to communicate signals from the various sensors to a recording unit 22 at the Earth's surface. Other devices for communicating signals may include electromagnetic or acoustic telemetry along the drill string 12. The presence of and the type of signal communication device are not intended to limit the scope of the present invention.

During drilling, a pump 30 lifts drilling fluid ("mud") 26 from a tank or pit 28. The mud 26 is discharged by the pump 30 under pressure into a standpipe/hose combination 34. The mud 26 then flows into a rotating, sealed connection such as may be present in a top drive 20, or a kelly (not shown). The mud 26 then travels under pressure through an interior passage in the drill string 12. The mud 26 eventually exits through courses or nozzles (FIG. 1A) in the drill bit 14. After being discharged, the mud 26 cools and lubricates the bit 12, and lifts drill cuttings to the surface. At the surface, the mud 26 may pass through treatment devices 38 such as a degasser and shale shaker, to remove entrained gas and cuttings from the mud 26. After cleaning, the mud 26 is returned to the tank 28 for reuse.

The pressure of the mud 26 in the drill string may be modulated to convey signal information, as explained above. In such cases, one or more pressure transducers 32 may be configured to measure pressure in the standpipe 34. Pressure measurements may be conveyed to the recording unit 22 for decoding and interpretation. When seismic measurements are being made, as shown in FIG. 1, the recording unit 22 may also be in signal communication with one or more seismic sensors 24 disposed in suitable locations. In examples where seismic while drilling operations are conducted on the land surface, the seismic sensors 24 may be single or multi-component geophones, accelerometers or other particle motion sensing devices. In marine operations, the sensors 24 may be hydrophones or other pressure or pressure time gradient responsive sensors. The type of seismic sensor is not a limit on the scope of the present invention. It is also within the scope of the present invention to position the seismic sensors 24 in another wellbore (not shown) for cross-well imaging.

It is also within the scope of the present invention to use the seismic while drilling source during any aspect of operation of the wellbore, including, without limitation, tripping, wiping, reaming, and circulating. Any description relative to drilling is only intended to provide context and examples of when and how a seismic while drilling source may be used in a wellbore.

Figure 1B:
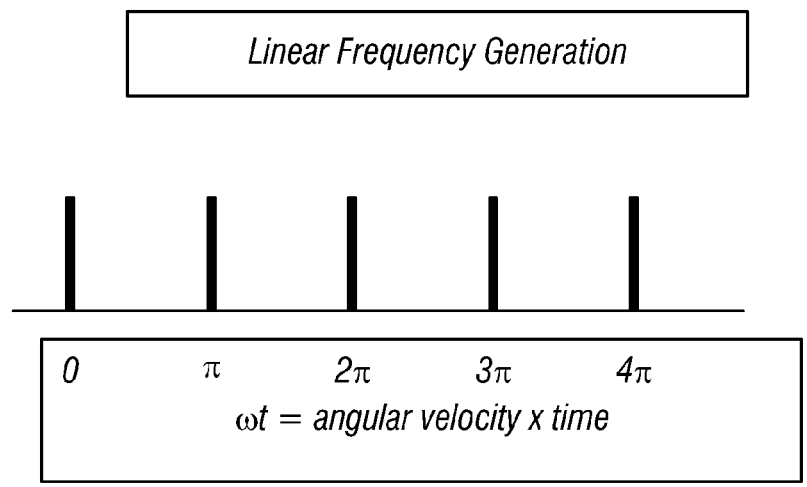
FIG. 1B graphically shows generating low frequency acoustic energy using a sparker by selecting a time interval between multiple sparks in a single firing sequence.

The seismic while drilling (SWD) energy source (e.g., disposed in the drill bit 14) in the present example uses a spark gap (referred to as a "sparker") to produce seismic energy by discharge of electric energy across the spark gap. In the present example, the sparker is actuated in at least one firing sequence having a plurality of individual actuations at a selected rate (or selected time interval between actuations), as shown in FIG. 1B, in order to produce seismic energy at selected frequencies substantially lower than that produced by a single actuation of the sparker. It has been determined that such sparker operation may produce substantial seismic energy at low frequencies, e.g., 2 Hz and below, and such low frequency may travel much larger distances through subsurface rock formations than the higher frequency energy associated with conventionally operated sparkers. Such low frequency energy may be expected to be detectable at the Earth's surface when generated at substantial depth in a wellbore below the Earth's surface. As explained earlier herein, the same principle of operation is believed to be applicable to any type of "impulsive" seismic energy source.

Following is an explanation of operating an impulsive seismic energy source according to the invention. Fourier's theorem states that any mathematical function which is periodic, single-valued, finite, and with a finite number of finite discontinuities within a period may be represented by a constant plus an infinite series of sinusoidal components whose frequencies are integral multiples of the lowest harmonic or fundamental frequency. This series is known as a Fourier series and may be expressed mathematically:

$$y = B_0 + A_1 \sin \omega t + A_2 \sin 2\omega t + A_3 \sin 3\omega t + \ldots A_n \sin n\omega t + B_1 \cos \omega t + B_2 \cos 2\omega t + B_3 \cos 3\omega t + \ldots B_n \cos n\omega t$$

where: $\omega$ represents angular velocity in radians per second and t represents time in seconds. It can be observed that the first harmonic or fundamental frequency, $A_1 \sin \omega t$, is the primary component. The second harmonic, $A_2 \sin 2\omega t$, and the successive harmonics typically become smaller and smaller in amplitude. It has been determined that any desired frequency can be generated by choosing the proper timing of spark discharge.

It has been determined, as stated above, that a desired acoustic energy frequency output of an impulsive type seismic source such as a sparker can be obtained by actuating the impulsive source in a sequence having multiple actuations therein for each desired acoustic impulse. The frequency content may be controlled by controlling the source actuation rate in each such sequence. A single source actuation will produce relatively high frequency acoustic energy that is characteristic of any impulsive type seismic source. By using two or more source actuations in each sequence, and by controlling the actuation rate in the sequence, lower acoustic frequencies can be produced. A lower actuation rate will generate more low frequency acoustic energy. That is, by controlling the time between successive source actuations in each sequence, the peak energy frequency of the acoustic energy can be decreased to a desired value. The peak energy frequency is generally equal to the reciprocal of the time between successive source actuations. For example, if the time between two actuations is 500 milliseconds, the peak energy frequency will be about 2 Hz.

The example in FIG. 1B shows multiple actuations of the example sparker spaced apart in time by $\pi\omega$ radians. The minimum number of actuations required in a particular firing sequence is two pulses. If more actuations in a particular sequence are used the signal to noise (S/N) ratio of the received seismic signals is expected to be improved as a function of 10 log n, where n represents the number of sparks in the sequence. Table 1 shows how the S/N increases as a function of n for a sparker operated as explained above.

TABLE 1

| Number of Sparks | 10 Log n | Gain in S/N (dB) |
|---|---|---|
| 2 | 3 | N/A |
| 4 | 6 | 3 (more than 2 sparks) |
| 6 | 7.8 | 1.8 (more than 4 sparks) |
| 8 | 9.0 | 1.2 (more than 6 sparks) |

It can be observed in Table 1 that the most increase in S/N ratio comes from increasing n from two to four sparks. As n is increased above four, the gain becomes proportionately less. As a result of the foregoing observation, it is believed that the most effective operation of the sparker is to use at least four sparks in each firing sequence.

The principle of operating a sparker according to the invention was tested in the laboratory. The laboratory test included a sparker suspended inside a cylinder made from rock formation. The cylinder included an eight and a half inch hole in the center, which is a typical size for a wellbore drill bit, and the hole in the cylinder was filled with tap water. Accelerometers were attached to the outside of the rock cylinder to measure vertical and horizontal acceleration produced in the rock formation by the sparker. Nine sets of data were recorded using the output from the horizontal accelerometer. This output of the horizontal accelerometer was analyzed with Sony Sound Forge 8.0 acoustic analysis software. A summary of the test results is shown below in Table 2.

TABLE 2

| Test No. | Spark Rate (Hz) | Interspark Period (seconds) | Peak Output Frequency (Hz) | Comments |
|---|---|---|---|---|
| 1 | 0.5 | 1.98 sec | 0-1 | |
| 2 | 1.2 | 0.806 | 1.0 | |
| 3 | 1.5 | 0.673 | 0-2 | |
| 4 | 2 | 0.51 | 0-2 | |
| 5 | 3 | 0.336 | 3 | |
| 6 | 4 | 0.246 | 4 | |
| 7 (two pulses) | 5 | 0.208 | 5 | |
| 8 (nine pulses) | 5 | 0.208 | 5 | 7 dB gain |
| 9 | 6 | 0.166 | 6 | |

Additional sparker experiments were conducted in the laboratory to determine the optimum operating voltage of the sparker when immersed in tap water. It has been determined that effective sparker operation in tap water occurs with a spark gap of about 3 mm, and a sparker operating voltage of about 3,000 V. Examples of various water based fluids and their corresponding electrical conductivities are shown in Table 3 below. The laboratory testing was performed in water having conductivity of tap water and of sea water. The laboratory testing as shown in Table 3 was conducted in fluids having electrical conductivity both much less than that of a typical water based drilling fluid (tap water) and much more than that of such drilling fluid (seawater). It is therefore expected that the sparker will operate properly in any ordinary drilling fluid. Further example of the ability to operate in a typical water based drilling fluid was the successful field test with the sparker located on the end of a drill string at a depth in a wellbore of 4,000 feet (about 1300 meters). Additional details concerning such test will be explained below.

TABLE 3

| Fluid | Total dissolved solids (mg/l) | Conductivity (μS/cm) |
|---|---|---|
| Deionized water | <0.1 | 0.5 |
| Typical tap water | 4.6 | 10 |
| Typical water based drilling fluid | 1100 | 1,351 |
| Sea water | 35,000 | 43,000 |
| Great Salt Lake water | 230,000 | 158,000 |

Sparkers used for wellbore deployed seismic sources known in the art are typically in the form of linear electrodes placed in proximity to each other. Such sparker configuration is not believed to be suitable for placement in a drill bit or other component of the drill string (12 in FIG. 1). An example configuration of a sparker according to the invention is shown in FIG. 1A. A spark gap electrode set 15 may be disposed in a suitable recess 17 in the body of the drill bit 14. The spark gap recess 17 may be on the side of the bit body, or may be placed proximate one or more of the mud passages 14A formed in the bit body. A check valve 19 may be placed in the central passageway for the drilling mud (26 in FIG. 1) in the upper end of the bit 14 so that when the sparker operates, pressure pulses created thereby do not travel toward the Earth's surface through the mud inside the drill string. The instrumentation 16 explained above with reference to FIG. 1 may be disposed in a drill collar or similar device connected in the drill string proximate the bit 14. Certain circuits (not shown separately) in the instrumentation 16 may be provided to operate the spark gap electrode set 15 ("spark gap") substantially as explained above.

Figure 2:
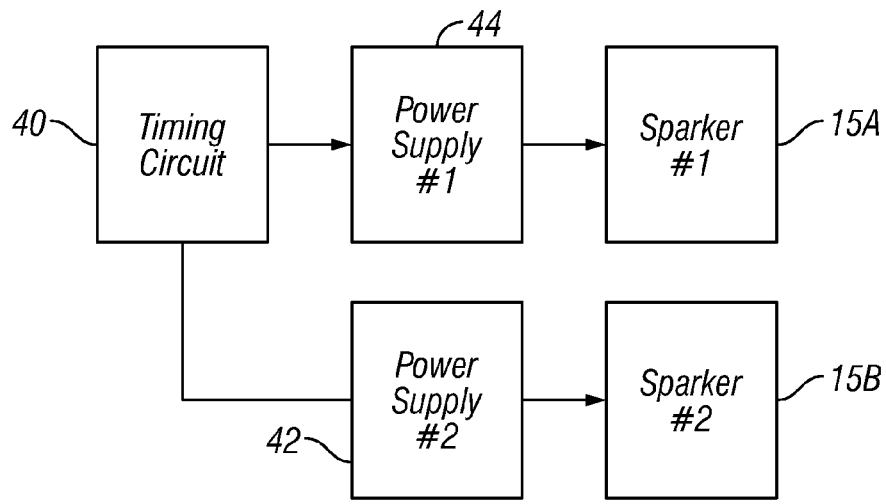
FIG. 2 shows a dual sparker power supply circuit.

Referring to FIG. 2, such circuits can be implemented with a single power supply and discharge timing circuit, or as shown in FIG. 2 a dual power supply and discharge timing circuit system may be used. Such system includes a discharge timing control 40 coupled to each of two power supplies 42, 44, each of which may include large capacitors or similar energy storage device. Each such power supply 42, 44 is coupled to a respective spark gap 15A, 15B, or a single spark gap. The timing control 40 in the system shown in FIG. 2 cycles back and forth between the two power supplies 42, 44 and consequently between the two electrodes 15A, 15B to produce a seismic signal as explained above. The system shown in FIG. 2 may provide the advantage of less strain on the power supplies 42, 44 and longer spark gap life.

Figure 1C:
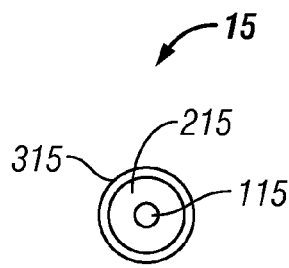
FIG. 1C shows an example spark gap configuration.

An example implementation of a spark gap that has been successfully tested is shown in FIG. 1C. The spark gap 15 may be substantially in the shape of a regular right cylinder, and can include a centrally disposed electrode 115 formed from molybdenum. An annular insulator 215, such as ceramic, may be disposed about the exterior of the center electrode 115. An annular outer electrode 315 may be made from stainless steel and be disposed about the exterior of the insulator 215. The spark gap 15 configured as shown in FIG. 1C is a surface gap device. Spark gaps as shown in FIG. 1C have been tested and it has been shown by such testing that a gap of 3 millimeters may provide useful results.

Figure 3:
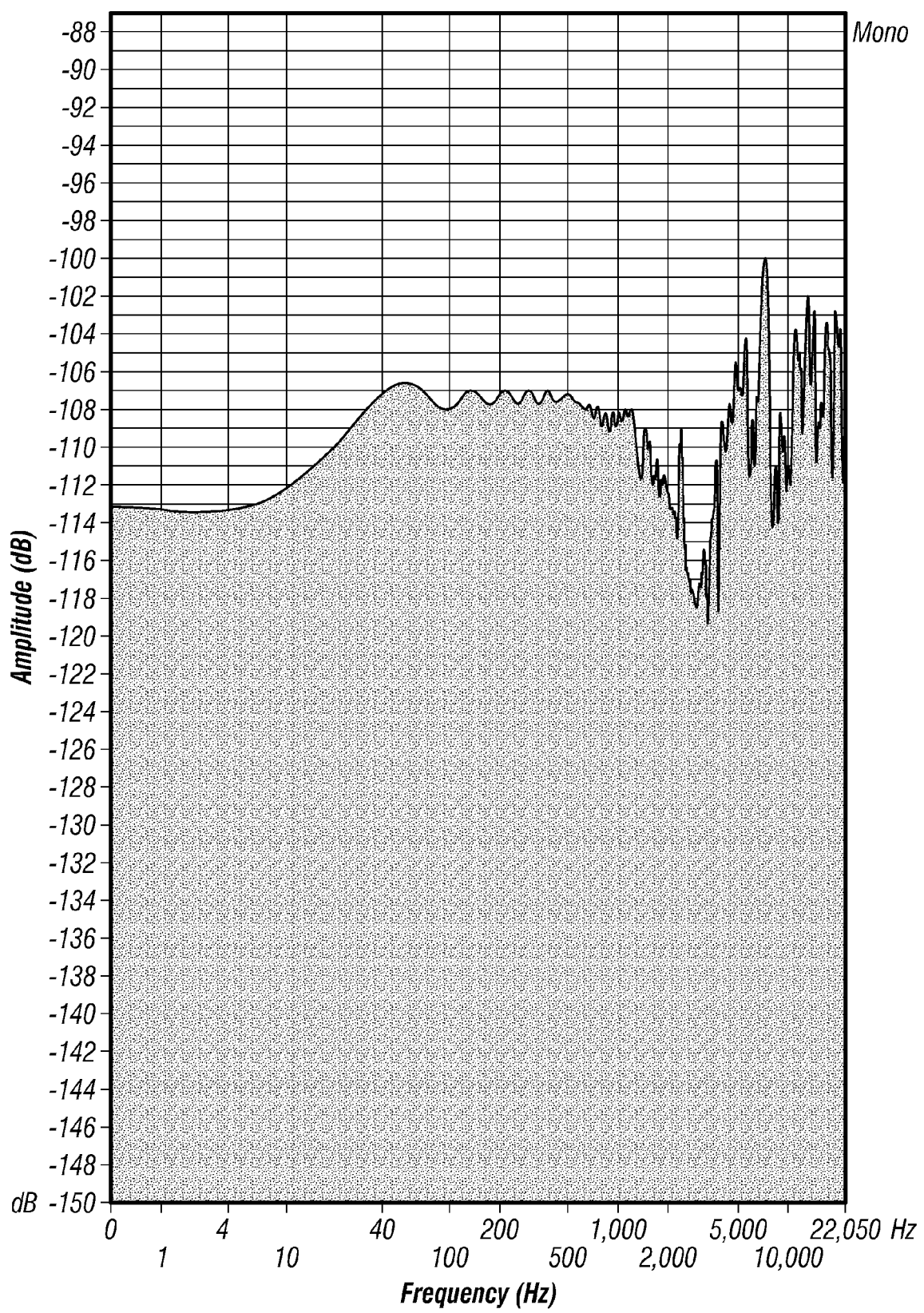
FIG. 3 shows an energy spectrum of a single spark.
Figure 4:
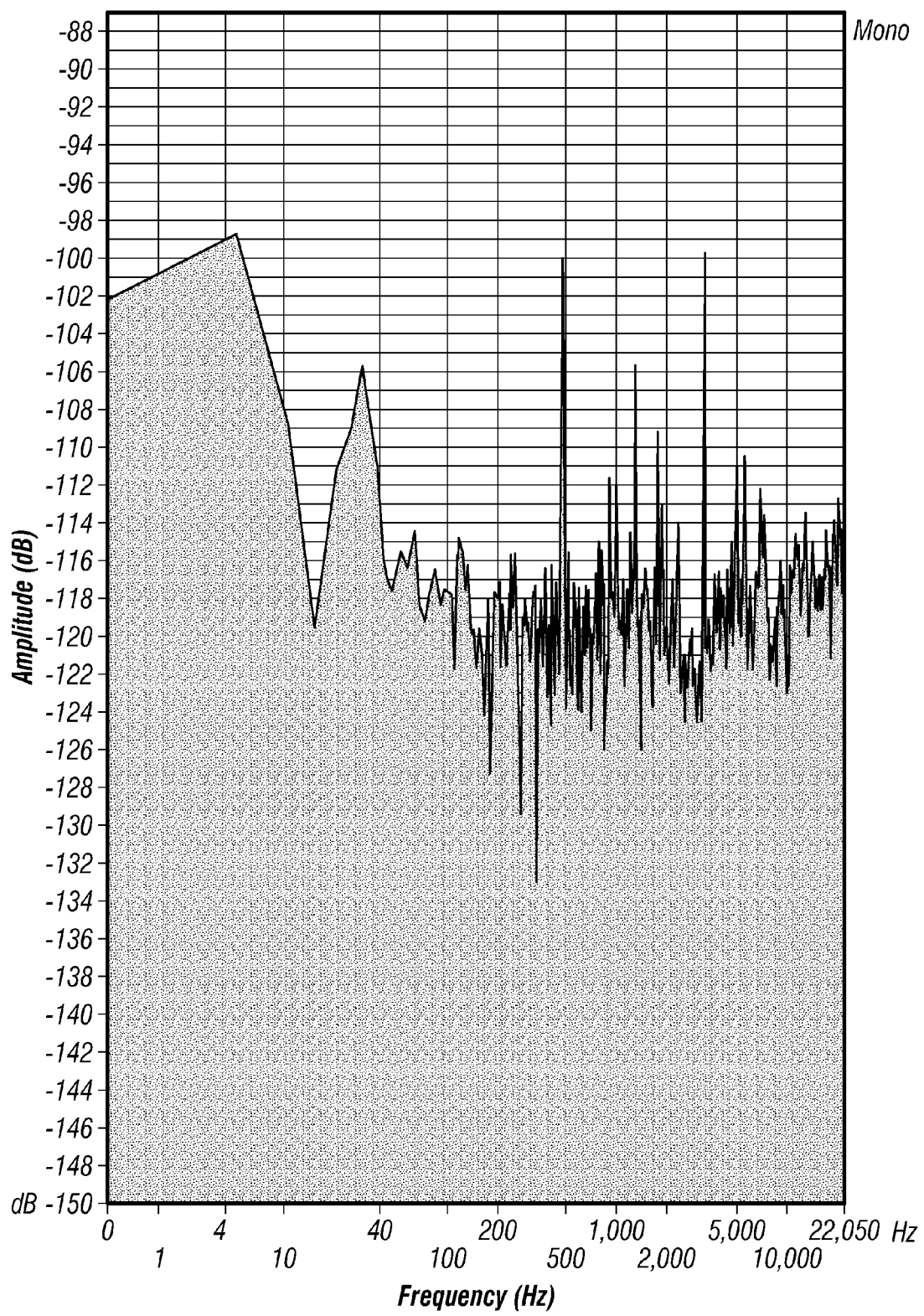
FIG. 4 shows an energy spectrum of two sparks separated by a particular time.

FIG. 3 shows a graph of the frequency spectrum of a single 100 Joule pulse discharged across a spark gap as shown in FIG. 1C in liquid, at a hydrostatic pressure such that the bubble period is 10 milliseconds. The fundamental frequency of the acoustic energy generated thereby peaks around 100 Hz. FIG. 4 shows the frequency spectrum of two 100 Joule pulses discharged across a spark gap as shown in FIG. 1C under the same conditions as the single spark of FIG. 3, wherein a time between the pulses is about 220 milliseconds. The two sparks so generated create an acoustic pulse having 4.5 hertz peak energy frequency.

A method and device for improving the quality of the acoustic signal produced by a sparker source is described below. The quality improvement is obtained by superimposing some of the various pressure pulses that result from the expansion and collapse of a spark-generated bubble. Suitably timed superposition of such pressure pulses results in higher pressures impacting the rock formation surface and in a more coherent fashion, thereby imparting a higher quality acoustic signal that can travel farther through the rock formations surrounding the wellbore.

Figure 5:
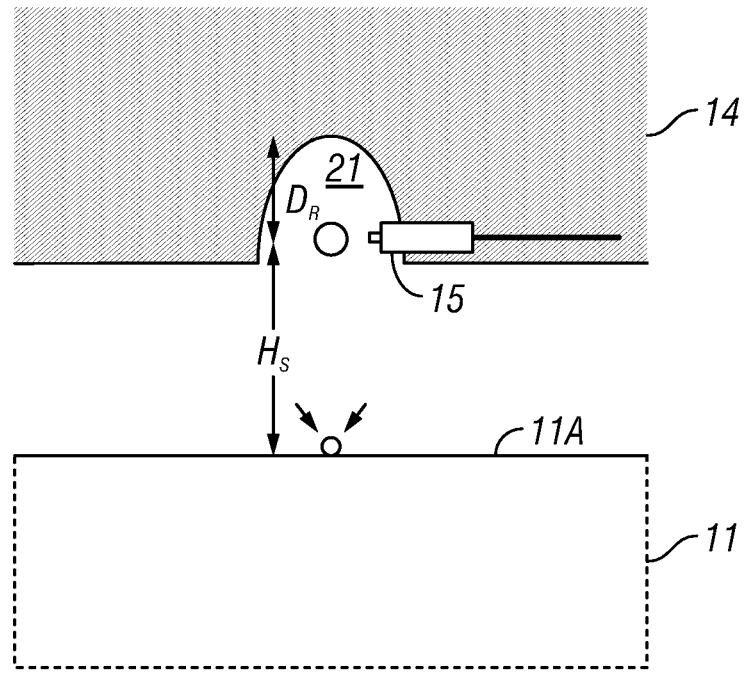
FIG. 5 shows an example sparker source disposed at the mouth of a reflector.

FIG. 5 shows an example spark gap 15 disposed at the mouth of a reflector cavity 21, which may be in the form of a suitably shaped recess or cavity disposed, for example, on the lower face of the drill bit 14. The depth of the reflector cavity 21 is represented by $D_R$. The stand-off height of the spark gap 15 above the surface 11A of the rock formation 11 is represented by $H_S$. In a wellbore, such surface 11A may be the bottom of the wellbore. After forming in the corona of the spark when electric current is passed through the spark gap 15, a gas bubble expands and moves away from the reflector 21. The bubble collapses within a fraction of a second, and if the stand-off $H_S$ is suitably selected, the collapse will occur somewhere near the rock formation surface 11A. Pressure pulses are generated both when the bubble forms and when it collapses.

The first pressure pulse that reaches the rock formation surface 11A is the bubble expansion pulse that travels directly from the expanding bubble. The bubble expansion pressure pulse, which radiates in all directions from the bubble, also reflects from the top of the reflector cavity 21 and reaches the rock formation surface 11A some time later. The pressure pulse resulting from bubble collapse also impacts the rock formation surface 11A, followed by the reflection of the bubble collapse pressure pulse from the top of the reflector cavity 21.

Figure 6:
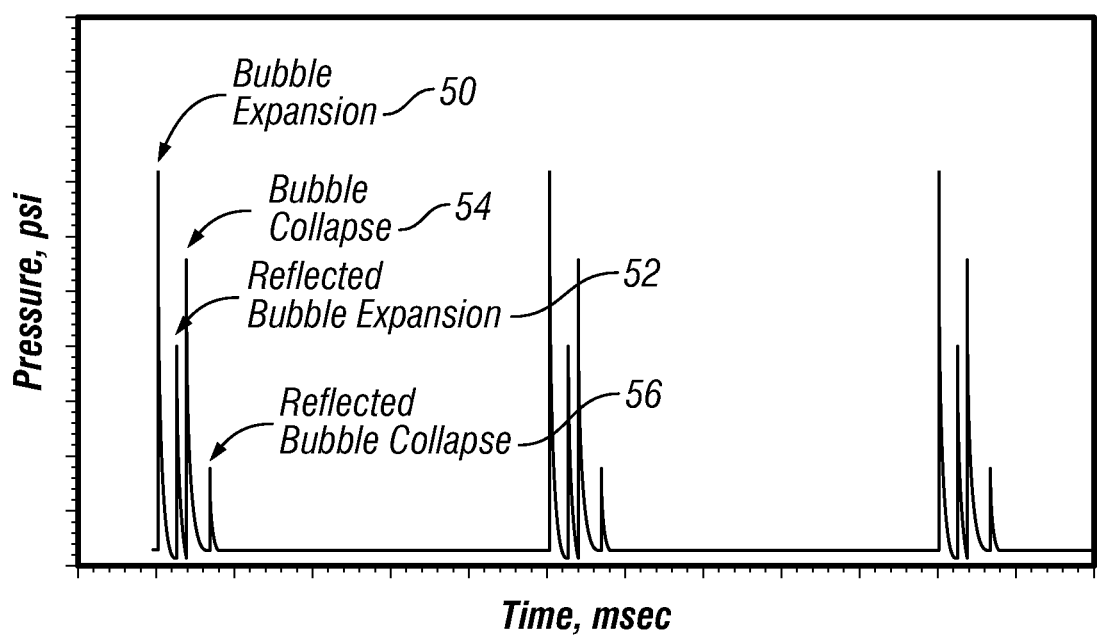
FIG. 6 shows a graph of signal amplitude of a bubble created by a spark using a reflector sparker combination as shown in FIG. 5.
Figure 7:
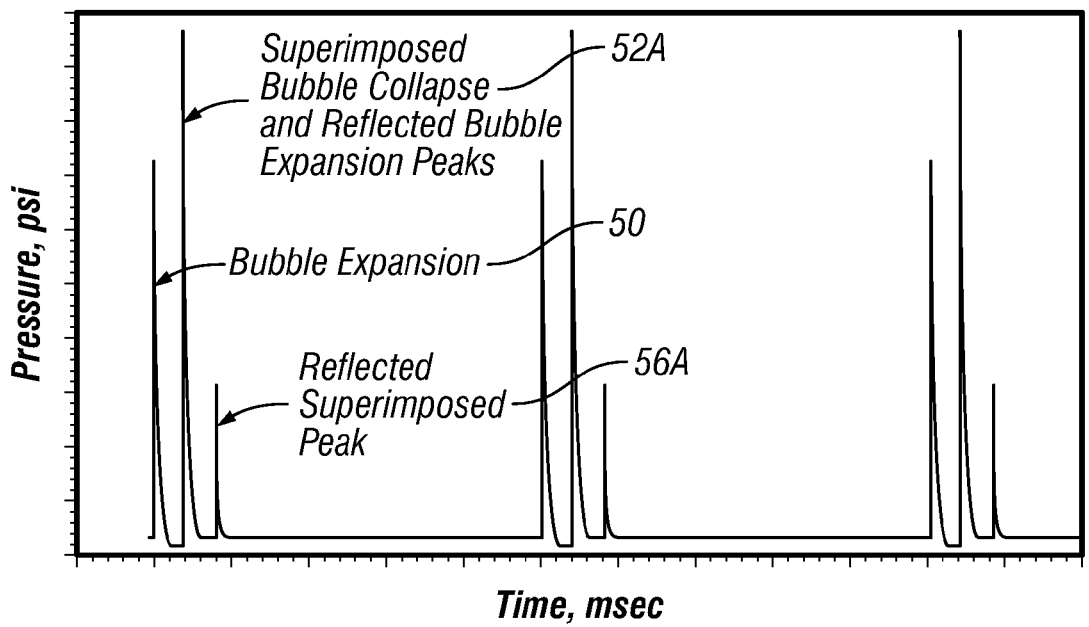
FIG. 7 shows a graph of signal amplitude of a bubble wherein the reflector depth and the spacing from sparker to the rock formation is such that constructive interference takes place.

The concept of superposition of some of these pressure pulses is illustrated in FIGS. 6 and 7. In the first case, shown in the graph of FIG. 6, the bubble expansion wave pressure is at amplitude peak 50. In the example in FIG. 6, the reflector depth ($D_R$) and stand-off distance ($H_S$) are selected such that the bubble-expansion pressure wave that reflects from the top of the reflector cavity, shown at amplitude peak 52, reaches the rock surface (11A in FIG. 5) just prior to the arrival of the bubble-collapse pressure peak, shown at amplitude peak 54. The reflected bubble expansion pressure wave is, therefore, slightly out of phase with the bubble-collapse pressure wave peak amplitude. The bubble-collapse pressure wave is also partially reflected by the reflector and reaches the rock surface some time later although greatly attenuated, as can be observed at peak 56.

In the second case illustrated in the graph of FIG. 7, the reflector depth, $D_R$, is selected such that the reflected bubble-expansion pressure wave amplitude peak will arrive at the rock surface (11A in FIG. 5) at substantially the same time as the bubble-collapse pressure wave amplitude peak. The principle of superposition suggests that the two pressure waves in such time relationship should be additive, resulting in a much higher bubble collapse-pressure peak amplitude, and this is shown at amplitude peak 52A. A partial reflection of the single, superimposed pressure wave will then arrive at the rock surface (11A in FIG. 5) some time later, as shown at amplitude peak 56A.

In comparing the acoustic signals shown graphically in FIGS. 6 and 7 it can be observed that the reflector (21 in FIG. 5) can improve the output of the acoustic source by increasing the peak pressures striking the formations. It should be noted that the reflector also increases the amount of acoustic energy actually striking the rock surface, regardless of its timing relative to bubble formation and collapse by reflecting back some of the energy that otherwise would travel away from the rock surface. Such reflection also improves the amplitude of the acoustic signal coupled into the rock formations.

Whether or not the bubble-collapse pressure is amplified depends on the timing of the reflected energy, which in turn depends on the depth of the reflector and the sparker stand-off distance from the bottom of the wellbore. The time $t_e$ for the bubble-expansion pressure wave to reach the rock surface is:

$$t_e = H_S/c$$

where c is the acoustic velocity in the drilling fluid and it is assumed that the bubble undergoes most of its expansion near the sparker. The time $t_r$ for the reflected bubble-expansion wave to reach the rock surface is:

$$t_r = (2D_R + H_S)/c$$

If it is assumed that the bubble collapses near the rock surface (bottom of the wellbore), the collapse peak pressure occurs at time $t_c$ given by the expression:

$$t_c = T$$

where T is the bubble period. For maximum amplification of the bubble-collapse pressure, the reflected expansion wave should arrive exactly at the time of bubble collapse, or $$t_r = t_c$$

Combining the above equations produces the relationship for the critical depth of the reflector ($D_{Rcrit}$) to achieve maximum amplification of the bubble-collapse pressure:

$$(D_{Rcrit}) = (cT - H_S)/2$$

The well-known modified Rayleigh-Willis equation for the period T of a spherical steam-generated bubble is:

$$T = 0.7[0.000209(10^{10} Q_e)^{1/3}/(L_e + 33)^{5/6}]$$

Where $Q_e$ represents the energy delivered by the spark, in kJ, $L_e$ is the effective well depth, in ft; and T represents time in seconds. The critical depth of the reflector is a function not only of the sparker stand-off distance, but also the sparker energy and the depth of the well. For typical wellbore conditions at a depth of, for example, 2000 ft, with an acoustic velocity in the wellbore fluid of 4663 ft/sec, a sparker energy of 100 J, and a sparker stand-off distance of 3 inches, the bubble period and critical reflector depth can be calculated to be T=0.26 msec and $(D_{Rcrit})$=5.7 inches.

At a greater wellbore depth, for example, 5000 ft, for example, the above parameters can be calculated to be T=0.12 msec and $(D_R)$crit=1.9 inches. For maximum effect, the reflector depth would thus need to change with wellbore depth. Considering the other variables that affect the critical reflector depth, it is desirable to have a system that enables adjustment of the reflector depth to obtain a maximum amplitude acoustic signal. One example of such system will be explained below with reference to FIG. 8.

Even without adjusting the reflector depth to achieve perfect superposition, however, a significant benefit in acoustic quality signal is achieved by designing the reflector for the maximum wellbore depth expected. Such design requires a relatively shallow reflector that causes the reflected bubble-expansion pressure pulse to arrive in most cases at the rock surface (11A in FIG. 5) prior to or at the same time as the bubble-collapse pressure pulse. This means that the reflected energy returns to the rock surface within the time window between the direct arrival of the expansion and collapse pressure peaks. The foregoing improves the coherency of the multiple pressure pulses resulting from a single bubble, thereby improving its quality as an acoustic source, even without perfectly timed superposition of the pressure pulses. It is also believed that using a reflector will reduce the amount of energy coupled to the drill string. Energy loss to the drill string has otherwise been a substantial difficulty in implementing a seismic while drilling energy source.

Figure 8:
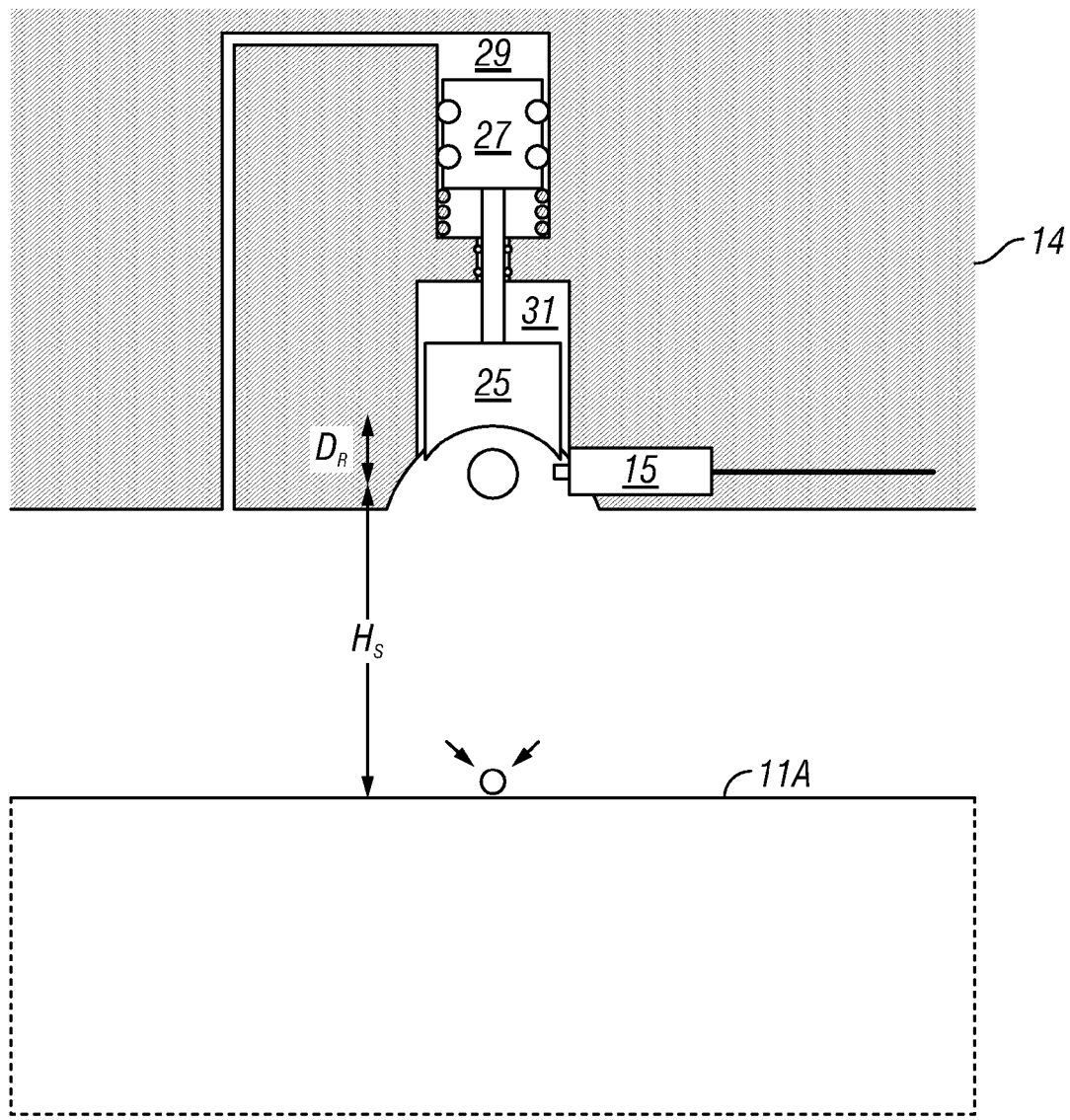
FIG. 8 shows an example of a selectable depth reflector for a sparker.

In one example, and referring to FIG. 8, the depth of the reflector cavity 21 may be adjusted by including a movable reflector housing 27 along a mating cylinder 31. The cylinder 31 may be formed in a suitable location in the drill bit 14. The movable housing 27 may be caused to move along the interior of the cylinder 31 by a piston 27 cooperatively engaged within an actuator cylinder 29. The actuator cylinder 29 may be coupled to suitable hydraulic mechanism (not shown separately) to enable the piston 27 and the reflector housing 27 to be moved to a selected position.

During operation of the example sparker shown in FIG. 5 or FIG. 8, a value of $H_S$ is determined as explained above. The drilling rig (18 in FIG. 1) may be operated to lift the bit 14 off the bottom of the wellbore by an amount such that the spark gap 15 is disposed above the bottom of the wellbore by the distance $H_S$. The spark gap 15 may then be actuated as explained above with multiple sparks in each firing sequence spaced apart by a time selected to provide a peak acoustic energy at a selected frequency.

It has been determined through testing that the peak energy frequency output of the sparker will be substantially constant, independent of the depth at which the sparker is disposed in a wellbore. The sparker will operate with all commonly used drilling mud types. The energy produced by the sparker will also be substantially constant at any wellbore depth, and is only dependent on the output of the power supply used to operate the sparker. It has also been determined through testing that the output of a sparker used in a wellbore can be improved by selecting a dielectric strength (as measured by a voltage breakdown test value) of the fluid disposed in the wellbore. In one example, a voltage breakdown test value of 1,000 volts may provide increase acoustic signal amplitude.

A drill collar disposed sparker source was tested in a wellbore at the Rocky Mountain Oil Test Center operated by the United States Department of Energy. The testing so performed was intended to determine if surface detectable seismic energy can be generated in a wellbore at ordinary petroleum exploration depths. Testing was performed with a sparker system as explained above disposed in an eight inch diameter drill collar with a length of 25 feet. The test sparker was powered by electrical energy generated by a 13 hydraulic horsepower fluid flow operated, turbine driving a 60 volt output alternator. The fluid was pumped at about 250 gallons per minute (GPM). The sparker operating voltage was set to 3000 volts as explained above, fired by a downhole controller to create dual sparks in each sequence that were spaced 500 milliseconds apart. Such firing sequences were repeated every 20 seconds.

Figure 9A:
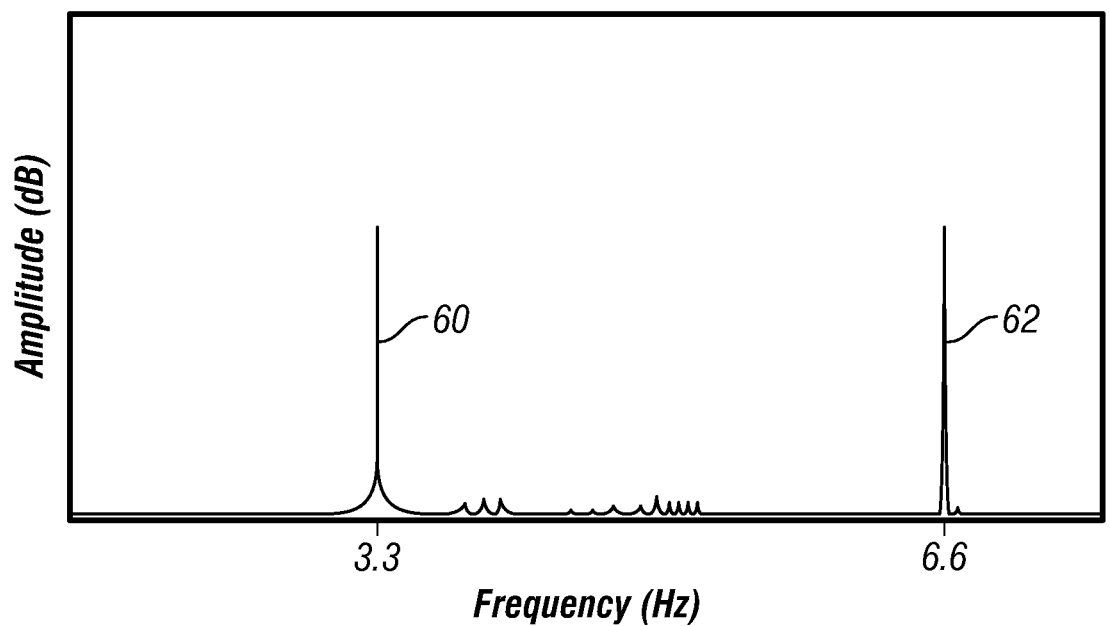
FIGS. 9A and 9B show energy spectra for a sparker source operated according to one aspect of the invention.
Figure 9B:
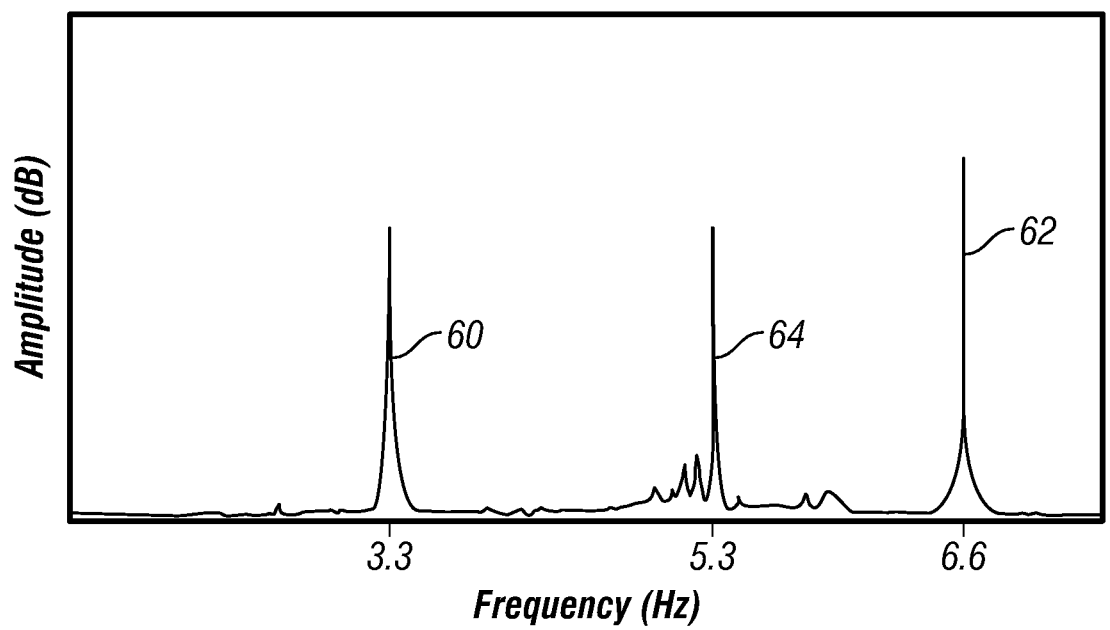

Field testing of the sparker on a drill string proved that the sparker, emitting a 2 Hz signal by pulsing every 500 seconds, was modulated by the existing 3.3 Hz signal created by the mud pumps shown in FIG. 9A to create a 5.3 Hz signal shown in FIG. 9B. Also shown in FIG. 9B with the modulated sparker signal is the mud pump background noise at 3.3 Hz and 6.6 Hz. While not anticipated before the test by the seismic recording team, the reason the 2 Hz signal was not recorded was because the seismic sensors were not capable of detecting signals of less than 3 Hz due to a 12 dB per octave inherent sensitivity decrease below 3 Hz.

The foregoing signal modulation is believed to be useful for direct detection of subsurface hydrocarbon reservoirs using naturally occurring seismic energy. The existence of a very low frequency (0.1-0.35 Hz), long wavelength ambient acoustic energy in the Earth has been established in scientific literature, and is generally attributed to oceanic wave activity along the coast of each land mass. Such long wavelength acoustic energy can propagate hundreds or thousands of kilometers within the Earth's crust. Three mechanisms believed to be related to the observed direct hydrocarbon indicators (DHIs) in the background noise of the Earth are proposed in Graf, R., Schmalholz, S. M., Podladchikov, Y., and Saenger, E. H., 2007, *Passive low frequency spectral analysis: Exploring a new field in geophysics*, World Oil 228, 47-52. Information published on the Internet, by Spectraseis A G, Giessereistrasse 5, 8005 Zurich, Switzerland at the URL http://www.spectraseis.com condensed the foregoing three mechanisms to two primary mechanisms, resonant amplification and resonant scattering. Time reverse modeling of field data acquired by Spectraseis in Austria, backed by synthetic modeling and processing, suggests that passively-recorded microtremors over a reservoir can be used to isolate the reservoir body as a discrete energy source. This supports the inference that a fundamental acoustic phenomenon occurs within the reservoir. As noted above, Spectraseis interprets these modeling results as a supportive of the resonant amplification models. See, Steiner, B., Saenger, E. H., and Schmalholz, S. M., 2007, *Time reverse modeling of microtremors: A potential method for hydrocarbon reservoir localization*, SEG Expanded Abstracts, 2115-2119. Generally speaking, the energy from such microtremors is of such low amplitude that extended length surveys are needed to detect interpretable signals originating in hydrocarbon reservoirs. In one aspect of the invention, based on the test results shown in FIGS. 9A and 9B, sparker energy generated at low frequencies, for example, 2-4 Hz, can be used to modulate the naturally occurring microtremor energy to generate a more readily surface-detectable seismic signal that indicates the presence of hydrocarbon reservoirs.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating an impulsive seismic energy source to increase low frequency output thereof, comprising:
    operating the impulsive seismic energy source in at least one firing sequence, the at least one firing sequence including at least two actuations of the source separated by an amount of time selected to cause acoustic energy resulting from the actuations to have a peak amplitude at a selected frequency, wherein the source emits substantially no energy during the amount of time.

2. The method of claim 1 wherein the operating comprises discharging electric current through a spark gap disposed in a wellbore.

3. The method of claim 2 wherein the at least one firing sequence is performed by at least two individual electrical power supplies alternately discharging through the spark gap.

4. The method of claim 2 further comprising detecting the acoustic energy at the Earth's surface.

5. The method of claim 2 further comprising selecting a breakdown test voltage of a fluid in the wellbore to maximize an amplitude of the acoustic energy.

6. The method of claim 2 further comprising reflecting a portion of the acoustic energy such that a peak amplitude of the reflected energy is substantially coincident with a peak amplitude of directly propagating acoustic energy at a rock formation surface in the wellbore.

7. The method of claim 6 further comprising adjusting a path length of the reflected energy with respect to depth of the spark gap in the wellbore, the adjusting a path length comprising at least one of changing a position of the reflecting with respect to a position of the spark gap and positioning the spark gap at a selected distance above a bottom of the wellbore.

8. The method of claim 1 further comprising imparting energy from the source into subsurface formations, wherein the frequency is selected such that naturally occurring seismic energy in the Earth caused by oceanic wave activity is modulated in the formations into a frequency range detectable by seismic sensors having a low frequency sensitivity limit of about 3 Hz, and detecting the modulated seismic energy.

9. The method of claim 8 wherein the selected frequency is about 2 Hz.

10. A system for generating seismic energy in a wellbore, comprising:
    a spark gap disposed in a drill string;
    a power supply disposed in the drill string and configured to discharge through the spark gap;
    a control circuit disposed in the drill string and operable to cause the power supply to discharge in firing sequences having at least two discharges separated by a time selectable to result in a determinable acoustic energy frequency output from the discharges, wherein substantially no energy is emitted from the spark gap during the time; and an acoustic reflector disposed in the drill string proximate the spark gap and configured to reflect acoustic energy from the spark gap into the wellbore, the reflector including a positioning device configured to move a wall of the reflector to a selectable distance from a wall of the wellbore.

11. The system of claim 10 wherein the spark gap comprises two concentric electrodes separated by a concentric insulator, and wherein a spacing between the concentric electrodes is about 3 millimeters.

12. The system of claim 10 wherein the power supply comprises at least two separate power supply devices, and wherein the control circuit is configured to alternately operate the at least two power supply devices within each firing sequence.

13. The system of claim 10 wherein the positioning device comprises a piston disposed in a cylinder, the piston coupled to the reflector wall to enable movement thereof.

* * * * *